United States Patent [19] [11] 3,932,362
Schneider et al. [45] Jan. 13, 1976

[54] AMORPHOUS POLYAMIDE OF C-ALKYL SUBSTITUTED DIAMINE AND TEREPHTHALIC ACID DIALKYL ESTER HAVING IMPROVED ELECTRICAL CREEP RESISTANCE

[75] Inventors: Johannes Schneider; Wolfgang Pungs, both of Troisdorf, Germany

[73] Assignee: Dynamit Nobel Aktiengesellschaft, Troisdorf, Germany

[22] Filed: Apr. 13, 1972

[21] Appl. No.: 243,848

Related U.S. Application Data

[63] Continuation-in-part of Ser. No. 771,208, Oct. 28, 1968, abandoned.

[30] Foreign Application Priority Data

Apr. 17, 1971 Germany............................ 2118753

[52] U.S. Cl. ........... 260/78 S; 260/37 N; 260/78 R; 260/857 UN; 264/329
[51] Int. Cl.² ......................................... C08Q 69/46
[58] Field of Search .......................... 260/78 S, 78 R

[56] References Cited
UNITED STATES PATENTS

| | | | |
|---|---|---|---|
| 3,145,193 | 8/1964 | Gabler | 260/78 R |
| 3,150,117 | 9/1964 | Gabler | 260/78 R |
| 3,198,771 | 8/1965 | Gabler | 260/78 R |
| 3,294,758 | 12/1966 | Gabler | 260/78 R |
| 3,294,759 | 12/1966 | Gabler | 260/78 R |
| 3,352,834 | 11/1967 | Schmitt et al. | 260/78 R |
| 3,449,299 | 6/1969 | Schneider et al. | 260/78 S |
| 3,538,056 | 11/1970 | Caldwell | 260/78 R |
| 3,563,959 | 2/1971 | Schade et al. | 260/78 R |
| 3,575,935 | 4/1971 | Elam | 260/78 R |
| 3,627,736 | 12/1971 | Raum et al. | 260/78 R |
| 3,846,379 | 11/1974 | Schneider et al. | 260/78 S |

OTHER PUBLICATIONS

Blow Molding–Jones, 1961, pp. 68–70.
Kirk–Othmer–Encyclopedia of Chemical Technology, Vol. 16, 2nd Edition, pp. 1, 98–99.
Injection Molding Theory & Practice –Rubin, 1972, p. 396.
Thomas–Injection Molding of Plastics, 1947, pp. 282–287.

*Primary Examiner*—Harold D. Anderson
*Attorney, Agent, or Firm*—Burgess, Dinklage & Sprung

[57] ABSTRACT

A polyamide sheet having electrical creep resistance of quality class KA 3b according to Deutsche Industrie Norm 53,480, especially one prepared by a screw injection molding process utilizing a kneading action under a pressure of between 5 and 80 kiloponds per square centimeter at a temperature of 240° to 320°C utilizing a polyamide of an alkyl substituted aliphatic diamine and a lower alkyl ester of terephthalic acid.

7 Claims, No Drawings

AMORPHOUS POLYAMIDE OF C-ALKYL SUBSTITUTED DIAMINE AND TEREPHTHALIC ACID DIALKYL ESTER HAVING IMPROVED ELECTRICAL CREEP RESISTANCE

CROSS REFERENCES TO RELATED APPLICATIONS

This application is a continuation-in-part of Application Ser. No. 771,208, filed Oct. 28, 1968, now abandoned, which application carried forward disclosure from and was copending with Application Ser. No. 561,412 of June 29, 1966, now U.S. Pat. No. 3,449,299.

BACKGROUND OF THE INVENTION

FIELD OF THE INVENTION

This invention is directed to polyamide sheets having electrical creep resistance of quality class KA 3b according to Deutsche Industrie Norm 53,480. More particularly, this invention is directed to such polyamide sheets obtained by subjecting certain polyamides of terephthalic acid alkyl esters and alkyl substituted aliphatic diamines to a specific type of kneading action in a screw injection molding apparatus to thereby improve the electrical creep resistance of the amorphous polyamides. This invention is also directed to such polyamide sheets having a modulus of elasticity according to Deutsche Industrie Norm 53,457 of at least 28,000 kiloponds per square centimeter.

DISCUSSION OF THE PRIOR ART

Amorphous polyamides based on alkyl-substituted aliphatic diamines and aromatic dicarboxylic acids, especially terrphthalic acid or dialkyl or diaryl esters thereof, are known. Alkyl-substituted aliphatic diamine components which these polyamides contain include 2,2,4-trimethylhexamethylenediamine, 2,4,4-trimethylhexamethylenediamine, 1,7-diamino-4,4-dimethyloctane, or mixtures of these diamine components. Such amorphous polyamides have high tensile strength and high Martens thermal stability of shape, and they are rigid. Also, in thick-walled moldings they have a transparent appearance which is not altered even by long holding in a mold at elevated temperature. Since additionally they have a low and constant fabrication shrinkage and have a low coefficient of thermal expansion, they are especially suited for the manufacture of hard, tough articles of high compressive strength.

These polyamides can be produced basically by any of the processes commonly used for the manufacture of prior art polyamides containing dicarboxylic acid and diamine radicals. For example, the aqueous concentrated solution of the salt made from an aromatic dicarboxylic acid and a diamine can be polycondensed under pressure at first and then in the melt with the pressure removed at temperatures up to about 80°C. Also, the pressure stage can be circumvented by precondensing the salt in high-boiling solvents and applying a vacuum in the final stage of the polycondensation.

Furthermore, alkyl esters formed of aromatic dicarboxylic acids with alcohols of low molecular weight can be reacted with virtually equimolecular amounts of diamine in the presence of water with the yielding of alcohol, and the product can be polycondensed in the form of an aqueous salt solution. Instead of alkyl esters of low molecular weight, the starting product can also be diaryl esters of the aromatic dicarboxylic acids, and in this case, the use of water can be avoided. Lastly, it is also possible to react dihalides of aromatic dicarboxylic acids at room temperature with virtually equimolar amounts of the diamine.

The above-discussed amorphous polyamides and their manufacture have already been described in detail in the following publications: U.S. Pat. No. 3,150,117; British Patent No. 1,049,987; Belgian Patent No. 723,154 and German Offenlegungschrift No. 1,947,217.

The fabrication of rigid shaped bodies of high impact strength from the above-named polyamides is generally performed by means of an injection-molding machine or in a heated press. Granular raw materials are preferably used. In the case of injection molding, temperatures of 260° to 320°C are normally used. In the case of the pressing process, temperatures of 190° to 230°C generally suffice. The articles made by these two methods have good mechanical and thermal properties. Their electrical characteristics ane fairly good, too. As far as their dielectric constants and dielectric loss factor are concerned, they fully comply with insulating material requirements.

In most cases, however, such polyamide products are not usable in the electrical field because they do not meet requirements in regard to electrical creep resistance. On the basis of DIN 53480, they must be placed in Class KA 3a. Generally, however, higher classifications are required, such as KA 3b, for example. According to this DIN standard, a test must be made of the performance of the surface of solid insulating materials under the action of creep currents. In this test, the creep currents are produced on a standardized specimen of the material to be tested, between two electrodes to which a potential (AC) of 1 kilovolt is applied. The formation of a creep path is the visible result of a local thermal decomposition of the insulating material under the action of a creep current. In the KA test, the procedure is to let an electrically conductive test solution fall drop by drop between the two electrodes which are applied to the specimen and which have the alternating current applied to them. A determination is made of the number of drops from a defined dropper which are required in order to bring about a short circuit, and of how deeply the creep path has been etched after 101 drops. The thickness of the specimen is to be at least 3 millimeters. The test solution used in the KA test is test solution A, that is, distilled water with the addition of 0.1 weight percent $NH_4Cl$ (p.a.) and 0.5 weight percent of a sodium salt of a nucleus-alkylated napthalene sulfonic acid, for example, the sodium salt of di-n-butylnaphthalene sulfonic acid.

In Table 1 below are summarized the experimental findings determined on articles made from the above-mentioned amorphous transparent polyamides. Two different polyamides were used. One was produced by the polycondensation of dimethylterephthalate with an isomeric mixture of 2,2,4-and 2,4,4-trimethylhexamethylenediamine, and has a viscosity number of 130. Such is hereafter denominated "Type PA 1". The material in granular form was made into specimens for determining the electrical creep resistance in accordance with DIN 53480, using both a plunger-type injection molding machine and a compression molding machine. The operating temperature in the plunger type injection molding machine was 270°C at an injection pressure (pressure of the hydraulic fluid for the screw) of 1000 kp/cm². In the compression molding process, however, a temperature of 220°C was applied at a specific injection pressure of 250 kp/cm². Five individual experiments were performed with each of the polyamides in each machine. Table 1 shows that in all cases the best creep resistance that could be achieved was KA 3a.

SUMMARY OF THE INVENTION

In a particularly desirable embodiment, this invention contemplates a polyamide sheet having an electrical creep resistance of quality class KA 3b according to Deutsche Industrie Norm 53,480, particularly a sheet made from a polymer having a viscosity number between 120 and 160, which sheet has a modulus of elasticity according to Deutsche Industrie Norm 53,457 of at least 28,000 kiloponds per square centimeter. Sheets of the present invention are made of amorphous polyamides derived from a terephthalic acid dialkyl ester and an alkyl substituted aliphatic diamine, especially a diamine of the group consisting of 2,2,4-trimethylhexamethylene diamine, 2,4,4-trimethylhexamethylene diamine, and 1,7-diamino-4,4-dimethyl octane. Amorphous polyamides of such composition are formed into sheets having such properties by subjecting them to a kneading operation in a scew injection extruder in which the polymeric mass is churned concentrically under a pressure of between 15 and 35 kiloponds per square centimer while at a temperature between 270° and 300°C. This specific kneading and churning process performed in a screw injection molding apparatus provides sheets of amorphous polyamide having electrical creep resistances of quality class KA 3b according to Deutsche Industrie Norm 53,480.

It has been found, in accordance with the present invention, that the electrical creep resistances of amorphous polyamides can be changed appreciably so that such amorphous polyamides can be classified in the Class KA 3b according to DIN 53480 by merely subjecting the same to a kneading action, such as that which occurs in a screw type injection molding machine, such that the back pressure during such kneading in the screw type injection molding machine is between 5 and 80 kp/cm², preferably between 15 and 35 kp/cm². The treatment of the polyamide mass occurs within a precise temperature range, i.e., between a temperature of 240° and 320°C, preferably between 270° and 300°C. Amorphous polyamides so treated not only have improved electrical creep resistance, but have exceptionally good mechanical and thermal properties. These properties are not substantially adversely affected during the kneading treatment of the polyamides. Generally, the polyamide is subjected to such a kneading action under such conditions for a period of time between 5 and 120 seconds, preferably between 40 and 90 seconds.

In one embodiment of this invention, the electrical creep resistance of an amorphous polyamide, especially one prepared from a terephthalic acid ester or a C-methyl-substituted diamine of hexane or octane is improved by intimately incorporating in said amorphous polyamide a polyolefin such that the polyolefin is at least 20% by weight, based upon the weight of the entire composition. It has been found that such polyamides materially improve the electrical creep resistance of amorphous polyamides such that they can be classified in Class KA 3b.

The polyamides are preferably incorporated into the amorphous polyamides by subjecting the mixture to the above described kneading action under a pressure of between 5 and 80 kp/cm² at a temperature of 240° to 320°C.

It has been found that the electrical creep resistance of so treated polyamides is substantially unimpaired by the addition of pigments, such as titanium dioxide, to the amorphous polyamide mass. Alternatively, organic dyes of anthraquinone series having grain sizes between 40 and 500 microns can be added to the amorphous polyamide at concentrations of 0.01 and 1% by weight based upon the resultant polyamide mass. Such organic dyes not only do not affect the improved electrical creep resistance, but present no problems insofar as mechanical properties are concerned.

It was stated above that the amorphous polyamides are preferably ones formed by the polycondensation of a terephthalic acid ester. In cases wherein an alkyl ester of the terephthalic acid is employed, the alkyl group can have between 1 and 5 carbon atoms in the chain. In instances where an aryl ester of the terephthalic acid is employed, the aryl group can have a single aromatic nucleus, a branched aromatic nucleus, or a plurality of an aromatic nuclei bonded at a single carbon atom. Preferably, an alkyl ester of a lower aliphatic alkyl group, such as methyl and ethyl, is employed.

In accordance with this invention, it has been found that it is highly desirable to utilize amorphous polyamides which have a viscosity higher than that to be obtained after the kneading action is performed. Generally, the amorphous polyamides have a viscosity between 130 and 180. By subjecting such polyamides to the kneading action of the present invention, there is obtained a final amorphous polyamide component having a viscosity between 90 and 170.

DESCRIPTION OF SPECIFIC EMBODIMENTS

The etch depth in the test specimens as determined by DIN 53480 can be appreciably reduced, i.e., the creep resistance can be increased to KA 3b, if the above-named polyamides are modified by the addition of a polyolefin, especially polyethylene or polypropylene. The best procedure is to thoroughly mix a powder or fine granules made from the polyamides with powders made from the polyolefin, using a vortex mixer, such as a Wirbelmischer, for this purpose, and compounding this mixture in the melt in a twin-screw extruder, such as an Alpine Model DL60. Particularly good results in regard to the compounding are achieved by using a polyethylene having a density of about 0.927 to 0.930 g/cm³ or a polypropylene having a density of about 0.905 g/cm³. The improvement of the electrical creep resistance was not achieved, however, in a compound containing 10% or less by weight of the polyolefin. A definite improvement in this regard was not achieved until the polyolefin content amounted to at least 20% by weight.

The test results are shown in Tables 2 and 3, and indicate an improvement of the electrical creep resistance through the addition of polyolefins to amorphous polyamides. In these experiments in the determination of the electrical creep resistance, the procedure was quite analagous to that followed in the experiments listed in Table 1. The same two polyamide types PA 1 and PA 2 were used. In Tables 2 and 3 are also shown the mechanical and thermal characteristics. The experimental findings show that, in the process proposed above, the electrical creep resistance of the polyamides is indeed improved, but that their desirable thermal and mechanical characteristics are impaired. This is especially true in the case of the bending stress limit, the ultimate tensile strength and the Martens thermal stability of shape.

OBJECT OF THE INVENTION

The object of the invention is to prepare shaped bodies from amorphous polyamides, so that these bodies will have an improved electrical creep strength of Class KA 3b in accordance with DIN 53480 and will at the same time have good mechanical as well as thermal characteristics. It was found that such shaped bodies can be achieved by fabricating the above-described polyamides having viscosity numbers of 130 to 180 in a screw-type injection molding machine under very specific temperature and pressure conditions. Usually, the starting product is granules of these polyamides, and screw-type injection molding machines are used which contain screws with a compression of 1:2 or 1:3. Generally, such screw-type injection molding machines can have a compression of between 1:1.5 and 1:4. In this procedure, it is particularly important to maintain a pressure of the order of magnitude of 5 to 80 kp/cm$^2$ and temperatures of 240° to 320°C in the entrance zone of the injection molding unit.

The present invention is seen to be a process for the manufacture of shaped bodies, which is characterized in that amorphous polyamides which are prepared from terephthalic acid esters and C-methyl-substituted diamines of hexane and/or C-methyl-substituted diamines of octane, and which have, preferably, the higher viscosity numbers, e.g., 130 to 180, compared to the viscosity numbers of the finished product, and electrical creep resistance of Class KA 3a, are molded in a screw-type injection molding machine, such that the back pressures in the screw-type injection molding machine amount to 5 to 80 kp/cm$^2$, preferably 15 to 35 kp/cm$^2$, and the temperatures of the injection molding unit amount to 240° to 320°C, preferably 270° to 300°C. Good mechanical and thermal characteristics of the amorphous polyamide are retained during processing. In the use of the process of the invention, a reduction of the viscosity number of the polyamide is preferably brought about. In many cases, however, the reverse effect if achieved, i.e., the viscosity is increased.

In any case, this change is surprisingly accompanied by an improvement in the electrical creep resistance of the material. It is especially surprising that the mechanical and thermal characteristics remain virtually unaltered. If the same moldings are produced in a compression molding machine instead of an injection molding machine, or if the pressure or the temperatures in the entrance zone of the injection molding unit as prescribed by the invention are not maintained, moldings having electrical creep resistances of Class KA 3a are obtained, which in addition have poor mechanical and thermal characteristics.

It has also surprisingly been found that the moldings of the invention have improved wear characteristics while remaining virtually unaltered in all of their other characteristics when titanium dioxide of the rutile type having a grain size of, for instance, 63 to 200 microns is finely distributed in the polyamide in a concentration of approximately 0.5 to 3 weight percent. Such a polyamide is most simply obtained by adding this titanium dioxide while the polyamide is in the molten state.

Similar results are obtained also with molding compounds containing organic pigments and dyes of the anthraquinone series, the grain sizes of the anthraquinone derivatives being preferably between 40 and 500 microns and the concentrations being between about 0.01 and 1 percent by weight based on the weight of the molding.

Additives of this kind are more likely to produce an increase of wear than the opposite effect. In accordance with the invention, the polyamides may also contain the titanium dioxide and the anthraquinone derivative simultaneously.

By the process of the present invention, there is provided objects of amorphous polyamides obtained from the polycondensation of alkyl-substituted aliphatic diamines and aromatic dicarboxylic acids, especially terephthalic acid derivatives and C-methyl-substituted diamines of hexane of octane, which amorphous polyamides are characterized by viscosity numbers between 90 and 170, preferably between 120 and 160, a Martens thermal stability of shape in accordance with DIN 53458 of at least 100°C ±5°C, and an electrical creep resistance of Class KA as determined by DIN 53480. Preferably, the diamine component of the amorphous polyamide is selected from the group consisting of 2,2,4- and 2,4,4-trimethylhexamethylenediamine, 1,7-diamino-4,4-dimethyloctane or mixtures thereof. Desirably, such components have an elasticity modulus (bending test) in accordance with DIN 53457 of at least 28,000 kp/cm$^2$. Amorphous polyamides of the present invention prepared from 1,7-diamino-4,4-dimethyloctane are hereinafter referred to as "Type PA 2."

In the above-described process, reference has been made to subjecting the amorphous polyamide mass to a force between given levels of "kp/cm$^2$." In the present case, the abbreviation "kp" refers to the unit "kilopond." This unit, kilopond, is defined as the weight of the mass of one kilogram at the normal gravity acceleration. Thus, 1 kp equals 1,000 p (pond), which value, in turn, is equal to 9.80665 N (Newton). The unit kilopond is thus related closely to that of kilogram.

In order to more fully illustrate the nature of the invention and the manner of practicing the same, the following Examples are presented. Tables 1 through 8 attached hereto report the various properties of the components prepared in accordance with the Examples set forth below. A review of such data reveals that merely by subjecting amorphous polyamides to the screw-type churning or kneading action under the aforesaid conditions of pressure and temperature, there are provided molded amorphous polyamide articles of improved electrical creep resistance. Such polyamides also possess excellent mechanical and thermal characteristics as well as an exceptionally good modulus of elasticity, such as seen, for example, in Table 4 below.

EXAMPLE I

An amorphous polyamide which had been made by the polycondensation of dimethylterephthalate and an isomeric mixture of 2,2,4- and 2,4,4-trimethylhexamethylenediamine, with a viscosity number of 144, was made into 4 millimeter thick test plates in a screw-type injection molding machine manufactured by Eggert & Ziegler (Monomat 150 S), by means of a screw providing a compression of 1:2. The barrel temperatures in the direction of the nozzle amounted to 250, 270, 280, and 280°C. The first temperature given (250°C) represents, in the meaning of this invention, the temperature in the entrance zone of the injection molding unit. The die temperature in the injection molding unit amounted to 75°C; the screw speed was 30 rpm, at a current of 6 amperes. The specific injection pressure and the after-pressure were both set at 140 kp/cm$^2$, and the back-pressure was adjusted to 30 kp/cm$^2$. The viscosity number of the molded bodies prepared in this manner was approximately 138. A number of characteristic properties of the test specimens prepared from the particular polyamide under these conditions are listed in Table 4. On all five specimens a creep resistance of Class KA 3b was found. If the same amorphpus polyamide with the initial viscosity number of 144 was made into a 4 millimeter thick test plate in a prior-art manner (in a compression molding machine, for example), electrical creep resistances no better than Class KA 3a were achieved, although this plate had entirely the same mechanical and thermal characteristics as one made in accordance with the invention. That is, the values were the same as those which have been listed in Table 4.

EXAMPLE II

An amorphous polyamide on a basis of dimethylterephthalate and the isomer mixture of 2,2,4- and 2,4,4-trimethylhexamethylenediamine and having a viscosity number of 170 was made into 4 millimeter thick test specimens on the apparatus described in Example I, under the following conditions: barrel temperature (temperature in the entrance zone of the injection molding unit) 290°, 300°, 300°C; die temperature 85°C; screw speed 20 rpm; specific injection pressure and after-pressure 140 kp/cm$^2$; back pressure 10 kp/cm$^2$. The product was injection moldings whose viscosity number ranged from 150 to 160. The moldings made from the described polyamide under these conditions had the characteristics listed in Table 5. As regards their electrical creep resistance, they were all in Class KA 3b.

EXAMPLE III

An amorphous polyamide based on dimethylterephthalate and the isomer mixture of 2,2,4- and 2,4,4-dimethylhexamethylenediamine and having a viscosity number of 150 was intimately mixed in powder form by means of a vortex mixer with 3 weight percent of titanium dioxide (rutile type) with a grain size of approximately 150 microns and compounded in the molten state in a twin-screw extruder (Alpine DL 60). The barrel temperatures were 255°, 270°, 275°, 270° and 265°C. The screw speed was 17 rpm at a current drain of 26 amperes. The resulting granular product had a viscosity number of 140. This product was made into test specimens with the injection molding machine described in Example I. Here, the barrel temperatures were 240°, 260°, 270° and 270°C, the die temperature 80°C, the screw speed 30 rpm at a current drain of 6.3 amperes. The specific injection pressure and the after-pressure amounted to 140 kp/cm$^2$. The back pressure was 20 kp/cm$^2$. The injection-molded specimens consisted of a polyamide having a viscosity number of 132–136. Otherwise, they had the characteristics shown in Table 6.

EXAMPLE IV

An amorphous polyamide made of dimethylterephthalate and the diamine mixture used in the foregoing examples, and having a viscosity number of 136, was thoroughly mixed in granulated form (cylinders averaging 3 millimeters in diameter and 4 millimeters in length) with 0.5 weight percent of an anthraquinone dye manufactured by Farbenfabriken Bayer AG under the name Helioechtschwarz TW 6653 N (black dye), by means of a vortex mixer, and was compounded in the molten state with the apparatus described in Example III. The barrel temperatures were 255°, 270°, 275°, 270° and 260°C, the screw speed was 17 rpm at a current drain of 25 amperes. The resulting product was a granular compound having a visity number of 132. This granular compound was made into 4 millimeter thick test specimens in the screw injection molding machine described in Example I. The barrel temperatures were 250°, 270°, 280° and 280°C, the screw speed was 30 rpm, at a current drain of 6.5 amperes. The specific injection pressure and after-pressure were 140 kp/cm$^2$, and the back pressure was 20 kp/cm$^2$. The viscosity numner this time was lower; namely, around 120-122. The specimens made from the compounds under these conditions had the characteristics given in Table 7.

EXAMPLE V

An amorphous polyamide composed of dimethylterephthalate and 1,7-diamino-4,4-dimethyloctane, having a viscosity number of 126, was made into test specimens with the apparatus described in Example I, the barrel temperatures being 240°, 260°, 270° and 270°C, the die temperature 75°C, the screw speed 20 rpm at a current drain of 5.8 amperes, the specific injection pressure and post-pressure 140 kp/cm$^2$ and the back pressure 20 kp/cm$^2$. The specimens prepared from the the above-described polyamide under these conditions had the characteristics listed in Table 8. The viscosity number for these specimens amounted to 110.

Wherever the viscosity number is mentioned in this specification, it is understood to be the viscosity number defined in DIN 53727, 0.5 weight percent solutions of the polyamides in m-cresol having been used for its determination. The measurements were performed at 25°C.

For instance, it is apparent that other aromatic dicarboxylic acids can be used to prepare the amorphous polyamide, and that such can have substitution on the aromatic ring. Additionally, other diamines of varying degrees of substitution can be employed. The crux of the present invention involves improving the electrical creep resistance of such amines merely by subjecting them to a kneading process, such as is generated in a screw-type injection molding machine under such conditions that the back pressure is between 5 and 80 kp/cm$^2$, and the temperature of the mass is between 240° and 320°C.

Table 1

Electrical Creep Resistance Determined on Test Specimens 4 mm Thick in Accordance with DIN Standard 53,480

Polyamide made from dimethylterephthalate and 2,2,4-/2,4,4-trimethylhexamethylenediamine (Viscosity No. 130); Type PA 1

Polyamide made from dimethylterephthalate and 1,7-diamino-4,4-dimethyloctane (Viscosity No. 112); Type PA 2

| Specimen No. | 1 | 2 | 3 | 4 | 5 | 6 | 7 | 8 | 9 | 10 |
|---|---|---|---|---|---|---|---|---|---|---|
| Test solution A Number of drops for compression moldings and injection moldings | >101 | >101 | >101 | >101 | >101 | >101 | >101 | >101 | >101 | >101 |
| Etch depth in mm: compression moldings | >4.0 | 3.64 | 4.0 | >4.0 | >4.0 | >4.0 | 2.74 | 2.62 | 3.10 | 4.0 |
| injection moldings | 4.0 | 2.74 | 2.55 | 2.66 | 3.10 | 3.51 | 3.36 | >4.0 | >4.0 | 3.07 |
| Quality class | KA3a | KA3a | KA3a | KA3a | KA3a | KA3a | KA3a | KA3a | KA3a | KA3a |

Table 2

Characteristics of Compounds in Comparison With Characteristics of Unmodified Polyamides

| | DIN | Unit | PA 1 | Polyethylene wt-% 10 | 20 | 40 | Polypropylene wt-% 10 | 20 | 40 |
|---|---|---|---|---|---|---|---|---|---|
| Limit bending stress | 53452 | kp/cm$^2$ | 1250 | 825 | 575 | 348 | 800 | 470 | 450 |
| Notch impact strength | 53453 | cm·kp/cm$^2$ | 10 | 12 | 19 | 9 | 9 | 8 | 8 |
| Ultimate strength | 53455 | kp/cm$^2$ | 600 | 600 | 450 | 260 | 380 | 300 | 280 |
| Martens stability of shape | 53458 | °C | 100 | 93 | 85 | 55 | 80 | 73 | 58 |
| Number of drops of Test Solution A | 53480 | | | 101 | 101 | 101 | 101 | 101 | 101 | 101 |
| Etch depth in mm | " | | | approx. 2.5–4.0 | 2.6–2.8 | 1.3 | 1.1–1.4 | 2.4–3 | 1.1–1.6 | 1.3 |
| Class | " | | KA3a | KA3a | Ka3b | KA3b | KA3a | KA3b | KA3b | |

Table 3

Characteristics of Compounds in Comparison to the Characteristics of Unmodified Polyamides

| | DIN | Unit | PA 2 | wt.-% polyethylene 10 | 20 | 40 | wt.%- polypropylene 10 | 20 | 40 |
|---|---|---|---|---|---|---|---|---|---|
| Limit bending stress | 53452 | kp/cm$^2$ | 1100 | 700 | 500 | 320 | 720 | 530 | 400 |
| Notch impact strength | 53453 | cm.kp/cm$^2$ | 9.0 | 10 | 14 | 12 | 10 | 11 | 12 |
| Ultimate strength | 53455 | kp/cm$^2$ | 580 | 580 | 500 | 240 | 370 | 300 | 260 |
| Martens stability of shape | 53458 | °C | 108 | 96 | 90 | 60 | 85 | 76 | 60 |
| Number of drops of test solution A | 53480 | | >101 | >101 | >101 | >101 | >101 | >101 | >101 |
| Etch depth in mm | " | | 2.6–4.0 | 2.6–3.0 | 1.6–1.8 | 1.2–1.4 | 2.4–2.6 | 1.5–1.7 | 1.3–1.5 |
| Class | " | | KA3a | KA3a | KA3b | KA3b | KA3a | KA3b | KA3b |

Table 4

| Specimen No. | | | 1 | 2 | 3 | 4 | 5 |
|---|---|---|---|---|---|---|---|
| | DIN | Unit | | | | | |
| Ultimate strength | 53455 | kp/cm$^2$ | | | 600 – 630 | | |
| Notch impact strength | 53453 | cm.kp/cm$^2$ | | | 10 – 15 | | |
| Modulus of Elasticity (Bending test) | 53457 | kp/cm$^2$ | | | 28 500 | | |
| Martens stability of shape | 53458 | °C | | | 100 | | |
| Creep resistance Test solution A, number of drops | 53480 | drops | >101 | >101 | >101 | >101 | >101 |
| Etch depth | | mm | 1.2 | 1.6 | 1.5 | 1.4 | 1.3 |
| Class | | | KA 3b | KA 3b | KA 3b | KA 3b | KA 3b |

Table 5

| Specimen No. | DIN | Unit | 1 | 2 | 3 | 4 | 5 |
|---|---|---|---|---|---|---|---|
| Ultimate strength | 53455 | kp/cm$^2$ | | | 600 – 670 | | |
| Notch impact strength | 53453 | cm.kp/cm$^2$ | | | 10 – 15 | | |
| Modulus of Elasticity (Bending test) | 53457 | kp/cm$^2$ | | | 29 000 | | |
| Martens stability of shape | 53458 | °C | | | 100 | | |
| Creep resistance | 53480 | | | | | | |
| Test solution A, number of drops | | drops | >101 | >101 | >101 | >101 | >101 |
| Etch depth | | mm | 1.3 | 1.5 | 1.5 | 1.45 | 1.66 |
| Class | | | KA 3b | KA 3b | KA 3b | KA 3b | KA 3b |

Table 6

| Specimen No. | DIN | Unit | 1 | 2 | 3 | 4 | 5 |
|---|---|---|---|---|---|---|---|
| Ultimate strength | 53455 | kp/cm$^2$ | | | 600 – 620 | | |
| Notch impact strength | 53453 | cm.kp/cm$^2$ | | | 10–12 | | |
| Modulus of Elasticity (Bending test) | 53457 | kp/cm$^2$ | | | 29 000 | | |
| Martens stability of shape | 53458 | °C | | | 100 | | |
| Creep resistance | 53480 | | | | | | |
| Test solution A, number of drops | | drops | >101 | >101 | >101 | >101 | >101 |
| Etch depth | | mm | 1.45 | 1.03 | 1.56 | 1.58 | 1.22 |
| Class | | | KA 3b | KA 3b | KA 3b | Ka 3b | KA 3b |
| Abrasion resistance loss of weight | | | | | | | |

Table 7

| Specimen No. | DIN | Unit | 1 | 2 | 3 | 4 | 5 |
|---|---|---|---|---|---|---|---|
| Ultimate strength | 53455 | kp/cm$^2$ | | | 600 | | |
| Notch impact strength | 53453 | cm.kp/cm$^2$ | | | 10 – 12 | | |
| Modulus of Elasticity (Bending test) | 53457 | kp/cm$^2$ | | | 28 500 | | |
| Martens stability of shape | 53458 | °C | | | 100 | | |
| Creep resistance | 53480 | | | | | | |
| Test solution A, number of drops | | drops | >101 | >101 | >101 | >101 | >101 |
| Etch depth | | mm | 1.91 | 1.73 | 1.85 | 1.55 | 1.64 |
| Class | | | KA 3b | KA 3b | KA 3b | KA 3b | KA 3b |
| Abrasion resistance loss of weight | | | | | | | |

Table 8

| Specimen No. | DIN | Unit | 1 | 2 | 3 | 4 | 5 |
|---|---|---|---|---|---|---|---|
| Ultimate strength | 53455 | kp/cm$^2$ | | | 580 | | |
| Notch impact strength | 53453 | cm.kp/cm$^2$ | | | 8 – 10 | | |
| Modulus of Elasticity (Bending test) | 53457 | kp/cm$^2$ | | | 29 000 | | |
| Martens stability of shape | 53458 | °C | | | 100 | | |
| Creep resistance | 53480 | | | | | | |
| Test solution A, number of drops | | drops | >101 | >101 | >101 | >101 | >101 |
| Etch depth | | mm | 1.7 | 1.82 | 1.9 | 1.62 | 1.55 |
| Class | | | KA 3b | KA 3b | KA 3b | KA 3b | KA 3b |

What is claimed is:

1. A polyamide shaped object having an electrical creep resistance of quality Class KA 3b according to Deutsche Industrie Norm 53,480, said polyamide being an amorphous polyamide of a C-alkyl substituted aliphatic diamine of hexane or octane and a terephthalic acid dialkyl diester said polyamide shaped object prepared by screw injection kneading a polyamide having a viscosity number determined in accordance with Deutsche Industrie Norm 53727 employing a 0.5 weight percent solution of polyamide in m-cresol at 25°C of 130–180, said polyamide being of a C-alkyl substituted aliphatic diamine of hexane or octane and a terephthalic acid dialkyl diester, under a back pressure of between 5 and 80 kiloponds/cm$^2$ at a temperature between 240° and 320°C.

2. A polyamide shaped object according to claim 1, wherein said polyamide is an amorphous polyamide prepared from the polycondensation of a terephthalic diacid alkyl diester and a C-methyl-substituted diamine of octane or hexane.

3. A polyamide shaped object according to claim 2, wherein the diamine is selected from the group consisting of 2,2,4-trimethylhexamethylenediamine, 2,4,4-trimethylhexamethylenediamine and 1,7-diamino-4,4-dimethyloctane.

4. A polyamide shaped object according to claim 3 having a viscosity number between 90 and 170 determined in accordance with Deutsche Industrie Norm 53727 employing a 0.5 weight percent solution of polyamide in m-cresol at 25°C and a modulus of elasticity according to Deutsche Industrie Norm 53,457 of at least 28,000 kiloponds/cm$^2$.

5. A polyamide shaped object according to claim 4 having a viscosity number between 120 and 160, said viscosity number determined in accordance with Deutsche Industrie Norm 53727 employing a 0.5 weight percent solution of the polyamide in m-cresol at a temperature of 25°C.

6. A polyamide shaped object according to claim 5, wherein the diamine is 2,2,4-trimethylhexamethylenediamine or 2,4,4-trimethylhexamethylenediamine or mixtures thereof.

7. The polyamide shaped object according to claim 5, wherein the diamine is 1,7-diamino-4,4,-dimethyloctane.

* * * * *

UNITED STATES PATENT OFFICE
CERTIFICATE OF CORRECTION

PATENT NO. : 3,932,362
DATED : January 13, 1976
INVENTOR(S) : Johannes Schneider et al It is certified that error appears in the above-identified patent and that said Letters Patent are hereby corrected as shown below:

Columns 9-10, Table 2

All of the characteristics in the bottom line headed "Class" should be moved over one column to the right, whereby the "Unit" column in that line is blank.

The term of this patent subsequent to November 5, 1991 has been disclaimed.

Signed and Sealed this twenty-second Day of June 1976

[SEAL]

Attest:

RUTH C. MASON
Attesting Officer

C. MARSHALL DANN
Commissioner of Patents and Trademarks